J. GINTHER.
Roller and Harrow.
No. 82,512. Patented Sept. 29, 1868.
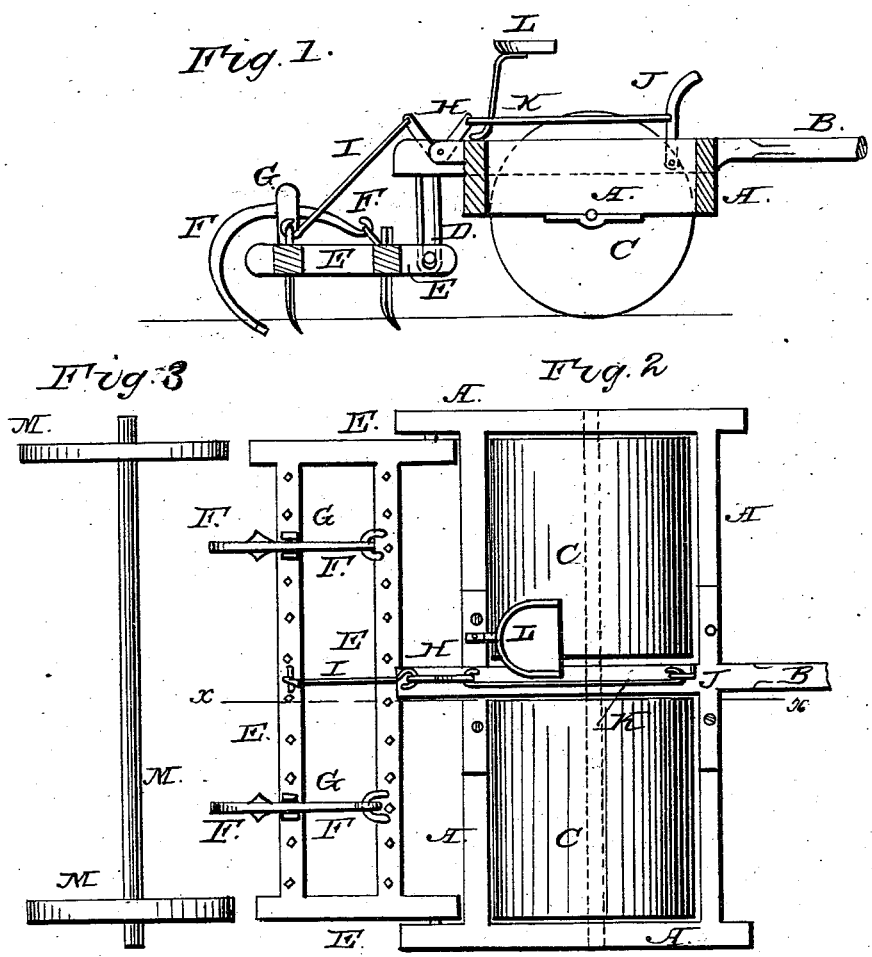

UNITED STATES PATENT OFFICE.

JACOB GINTHER, OF MIER, ILLINOIS, ASSIGNOR TO HIMSELF, WILLIAM FRIEND, AND WILLIAM SEIBERT, OF SAME PLACE.

IMPROVEMENT IN COMBINED ROLLER AND HARROW.

Specification forming part of Letters Patent No. 82,512, dated September 29, 1868.

*To all whom it may concern:*

Be it known that I, JACOB GINTHER, of Mier, in the county of Wabash and State of Illinois, have invented a new and Improved Combined Roller, Harrow, and Marker; and I do hereby declare that the following is a full, clear, and exact description thereof, which will enable others skilled in the art to make and use the same, reference being had to the accompanying drawings, forming a part of this specification, in which—

Figure 1 is a vertical section of my improved machine, taken through the line *x x*, Fig. 2. Fig. 2 is a top view of the same. Fig. 3 is a detail view of the wheels and axle.

Similar letters of reference indicate like parts.

My invention has for its object to furnish an improved combined roller, harrow, and marker, which shall be so constructed and arranged that the three devices may all be used together, or the roller alone, or the harrow alone, or the roller and harrow without the marker, or the harrow and marker without the roller, as may be desired.

It consists in the construction and combination of the various parts, as hereinafter more fully described.

A is the roller-frame of the machine, to which the tongue B is securely attached. C are the two rollers, which are pivoted to the frame A by bolts, or by a single long bolt, passing through the frame A, so that the said rollers may be easily detached from the said frame when desired. The ends of the side bars of the frame A project in the rear of the rear cross-bar, as shown in Figs. 1 and 2, and to said projecting ends are attached downwardly-projecting slotted arms B.

E is the harrow-frame, to which the teeth are attached in the ordinary manner. The side bars of the frame E project in front, and to their ends are attached pins or bolts, which pass through the slots in the arms D, and pivot and connect the harrow to the roller-frame A in such a way that the harrow may conform to the surface of the ground. By removing the pivoting pins or bolts the harrow may be readily detached from the roller.

F are the markers, which are made in hook shape, and the ends of which are connected to the forward part of the frame E. The said markers pass back through upwardly-projecting slotted arms G, attached to the rear part of said frame E, so as to keep the said markers in proper position while working. The markers F are connected to the frame E by eye-bolts, or similar means, so that they may be readily detached when required.

H is an elbow-lever, the angle of which is pivoted to the rear part of the frame A, and its rear arm is connected with the frame E by the connecting-rod I. The forward arm of the bent lever H is connected with the lever J by the connecting-rod K. The lower end of the lever J is pivoted to the frame A, and its upper end projects upward into such a position that it can be conveniently reached and operated by the driver from his seat L.

By this construction, by operating the lever J, the harrow may be raised from the ground for convenience in passing over obstructions, or for other desired purposes. When it is desired to use the harrow alone, or with the markers, the rollers C are detached, and the wheels and axle M inserted in the frame A in place of said rollers.

Having thus described my invention, I claim as new and desire to secure by Letters Patent—

The combination of the lever J, connecting-rod K, elbow-lever H, and connecting-rod I with the roller-frame A and harrow-frame E, substantially as herein shown and described, and for the purpose set forth.

JACOB GINTHER.

Witnesses:
  HENRY REIBER,
  ANDREW REIBER.